United States Patent [19]
Lin et al.

[11] Patent Number: 6,029,521
[45] Date of Patent: Feb. 29, 2000

[54] METHOD FOR MEASURING COVER THICKNESS OF REINFORCING BAR IN CONCRETE BY USING STRESS WAVE

[75] Inventors: Yiching Lin; Chia-Chi Cheng; Chia-Men Hsiao, all of Taichung, Taiwan

[73] Assignee: National Science Council, Taiwan

[21] Appl. No.: 09/174,658

[22] Filed: Oct. 19, 1998

[51] Int. Cl.[7] .............................. G01N 29/18; G01H 5/00
[52] U.S. Cl. ............................... 73/597; 73/584; 73/12.01
[58] Field of Search .............................. 73/584, 585, 587, 73/588, 596, 597, 598, 601, 602, 606, 618, 620, 627, 628, 629, 12.01, 12.08, 12.09; 702/170, 171, 35, 36, 39

[56] References Cited

U.S. PATENT DOCUMENTS

| | | | |
|---|---|---|---|
| 5,165,270 | 11/1992 | Sansalone et al. | 73/594 |
| 5,402,781 | 4/1995 | Dimarogonas | 73/584 |
| 5,404,755 | 4/1995 | Olson et al. | 73/584 |
| 5,438,872 | 8/1995 | Kobayashi et al. | 73/597 |

OTHER PUBLICATIONS

Lin et al., "Use of Stress Waves for Determining the Depth of Surface–Opening Cracks in Concrete Structures" ACI Materials Journal, Technical Paper Title No. 93–M57 vol. 93, No. 5, Sep.–Oct. 1996.

Wu et al., "A new method for measuring in situ concrete elastic constants using horizontally polarized conical transducers" J. Acoustical Society of America 101 (1) Jan. 1997, pp. 330–336.

*Primary Examiner*—Hezron Williams
*Assistant Examiner*—Helen C. Kwok
*Attorney, Agent, or Firm*—Venable; Robert J. Frank; Robert Kinberg

[57] ABSTRACT

A method for measuring the cover thickness of a reinforcing bar in concrete. An impacting device and a receiver are disposed on the concrete surface along the longitudinal axis of the reinforcing bar with a predetermined distance H provided between the impacting device and the receiver. Then, an impact is applied on the concrete surface by the impacting device, to generate a dilatational wave which propagates into the concrete and is totally refracted at an interface between the concrete and the reinforcing bar, and is received by the receiver. Then, the cover thickness of the reinforcing bar is calculated according to the travel time for the dilatational wave from the impact device through the reinforcing bar to the receiver.

7 Claims, 9 Drawing Sheets

METHOD FOR MEASURING COVER THICKNESS OF REINFORCING BAR IN CONCRETE BY USING STRESS WAVE

BACKGROUND OF THE INVENTION

1. Field of the Invention

The present invention relates in general to a method for measuring the cover thickness of a reinforcing bar in concrete by using stress waves.

2. Description of the Related Art

A very important parameter for the design of reinforced concrete is the cover thickness of reinforcing bars in the concrete, a variable which influences the development of the bond strength of the reinforcing bar, the width and distribution of the concrete cracks, and the durability of the concrete structure. Accordingly, in the assessment of structural safety, the cover thickness of reinforcing bars in concrete is always a main item.

Figure 1A:
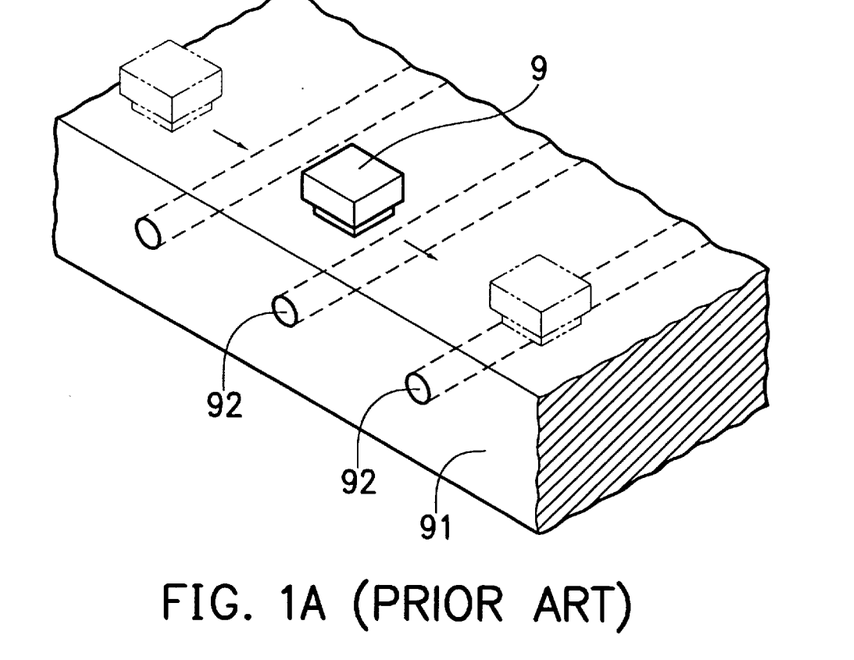
FIG. 1A is a schematic diagram of a reinforced concrete structure in which reinforcing bars are arranged sparsely.
Figure 1B:
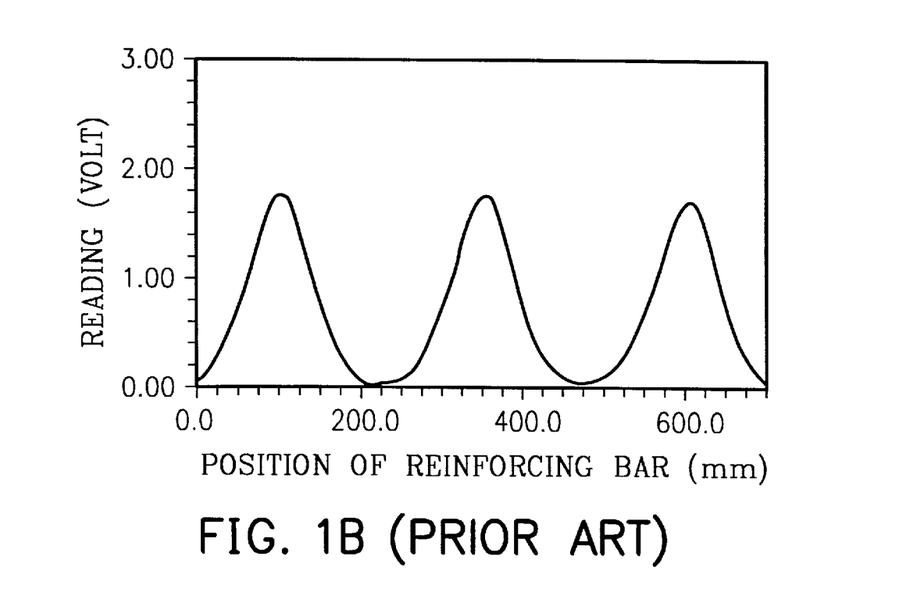
FIG. 1B shows a measuring result for the reinforced concrete structure of FIG. 1A, using a conventional electromagnetic wave measuring device.
Figure 2A:
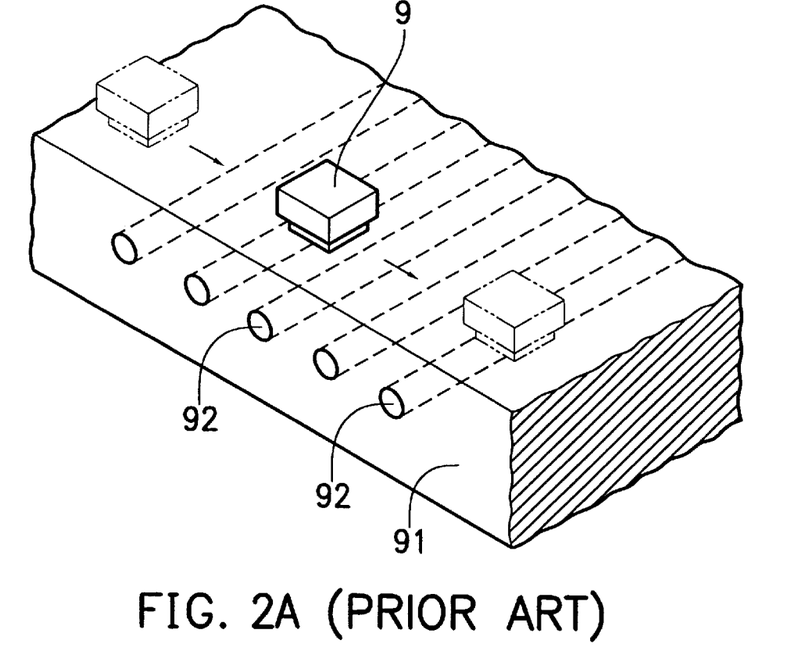
FIG. 2A is a schematic diagram of a reinforced concrete structure in which reinforcing bars are arranged densely.
Figure 2B:
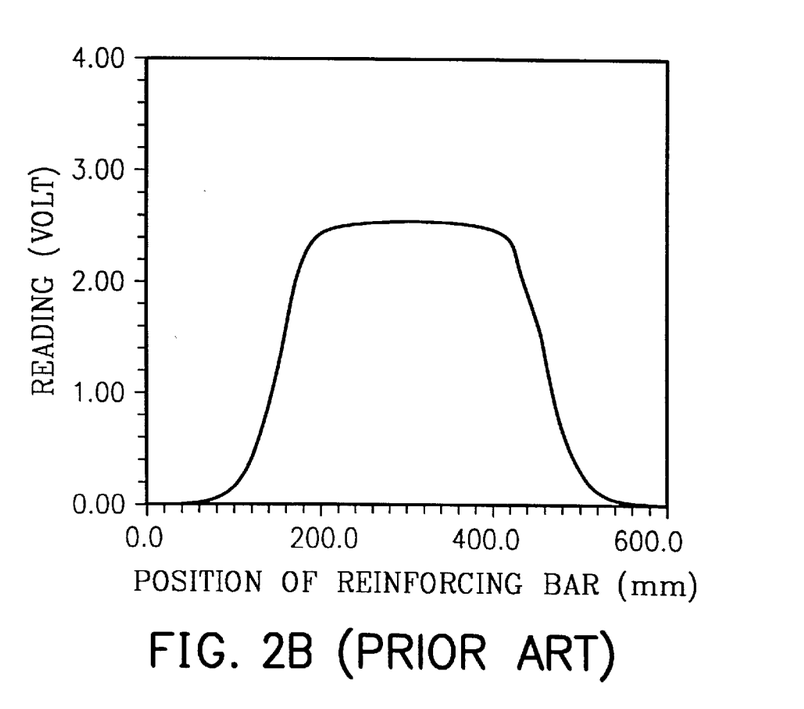
FIG. 2B shows a measuring result for the reinforced concrete structure of FIG. 2A, using a conventional electromagnetic wave measuring device.

The current methods for measuring steel reinforcing bars are all based on the principles of electromagnetic waves, and commercial measuring apparatuses thereof are available in the market. Referring to FIG. 1A, if reinforcing bars 92 in concrete 91 are arranged apart with a sufficient distance therebetween, then using the commercial measuring apparatuses 9 to measure the cover thickness of the reinforcing bars is effective (FIG. 1B). However, if the reinforcing bars in concrete are closely arranged as shown in FIG. 2A, then the reinforcing bars adjacent to the measured one interfere with the signals received. Analyzing the measured signals is very difficult because the signal interference is nonlinear, as shown in FIG. 2B. Unfortunately, the reinforcing bars in major concrete members, such as beams and columns, are always arranged very closely. Therefore, providing a means to effectively measure the cover thickness of a reinforcing bar in concrete is necessary.

SUMMARY OF THE INVENTION

An object of the present invention is to provide a method that solves the above-mentioned problem.

In accordance with the object of the present invention, a method for measuring the cover thickness of a reinforcing bar in concrete is provided, comprising the steps of:

(a) disposing an impacting device and a receiver on the concrete surface along the longitudinal axis of the reinforcing bar, with a predetermined distance H provided between the impacting device and the receiver;

(b) applying an impact on the concrete surface with the impacting device to generate a dilatational wave which propagates into the concrete and is totally refracted at an interface between the concrete and the reinforcing bar, and is received by the receiver;

(c) determining the travel time $\Delta t_S$ of the dilatational wave from the impacting device through the reinforcing bar to the receiver;

(d) calculating the cover thickness of the reinforcing bar by:

$$d_S = \frac{\frac{C_{PC}\Delta t_S - \alpha H}{2}}{\frac{1}{\cos\theta} - 2\alpha\tan\theta} \text{ with } \alpha = C_{PC}/C'_{PS}$$

wherein $d_S$ is the cover thickness of the reinforcing bar;

$\Delta t_S$ is the travel time of the dilatational wave from the impacting device through the reinforcing bar to the receiver;

$C_{PC}$ is a first speed of the dilatational wave in the concrete cover layer;

$C'_{PS}$ is a second speed of the dilatational wave in the reinforcing bar;

H is the distance between the impacting device and the receiver;

θ is a critical angle of incidence for totally refracting the dilatational wave.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 3:
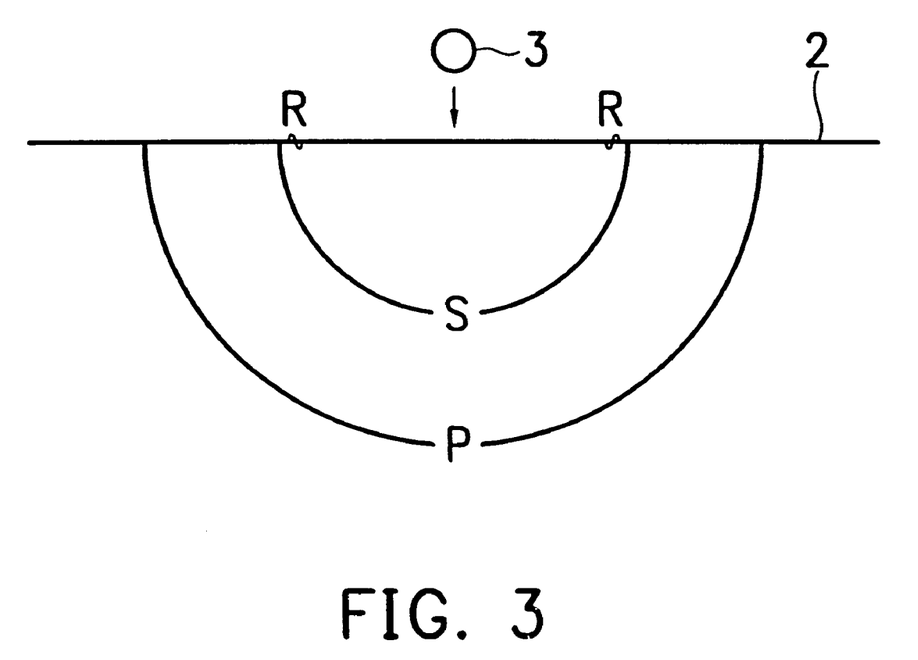
FIG. 3 is a schematic diagram of stress waves generated by an impact applied on an object.

If a mechanical impact is applied on a surface of an object, then transient stress waves are generated to propagate into the object. As shown in FIG. 3, the stress waves include a Rayleigh (R-) wave which propagates along the surface of the object 2, and a dilatational (P-) wave and a distortional (S-) wave which propagate into the object 2 along semi-spherical wavefronts. Among the stress waves, the P-wave propagates fastest and the R-wave propagates slowest. The S-wave propagates slightly faster than the R-wave.

A small steel sphere is very suited as the impact source. If the diameter of the selected small steel sphere is 2–5 mm, then, in general, the impact contact time ($t_C$) for concrete will be 15–40 $\mu$s (1 $\mu$s=$10^{-6}$ second) where the "impact contact time ($t_C$)" is defined as the duration of the impact on the object surface.

Figure 4A:
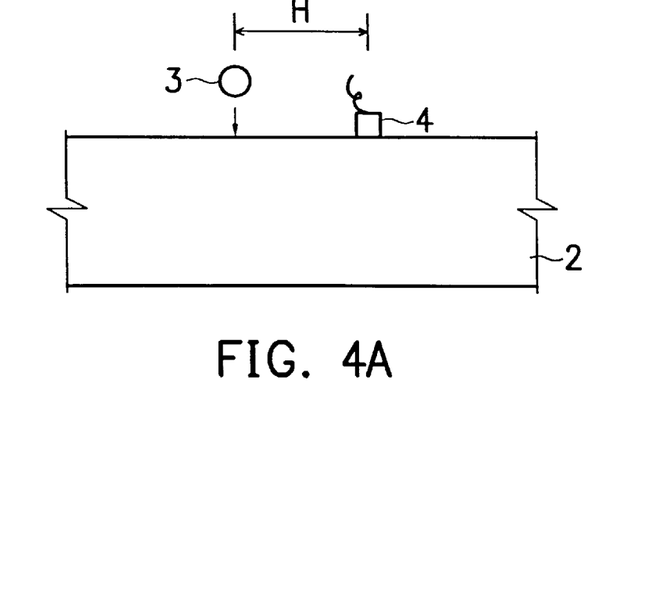
FIG. 4A shows an impact test for concrete without reinforcing bars.
Figure 4B:
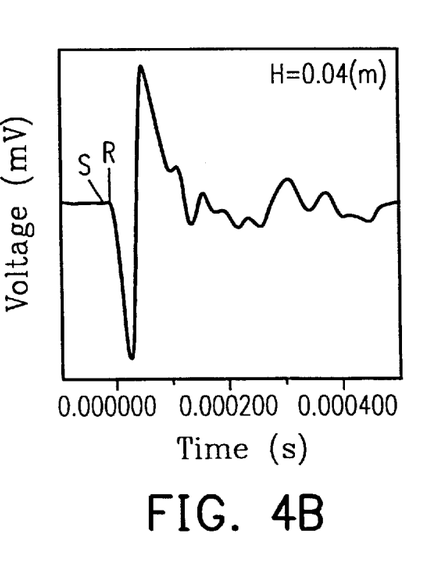
FIG. 4B shows a response waveform of the impact test according to FIG. 4A, wherein the distance between the impact point and the receiver is 0.04 m.
Figure 4C:
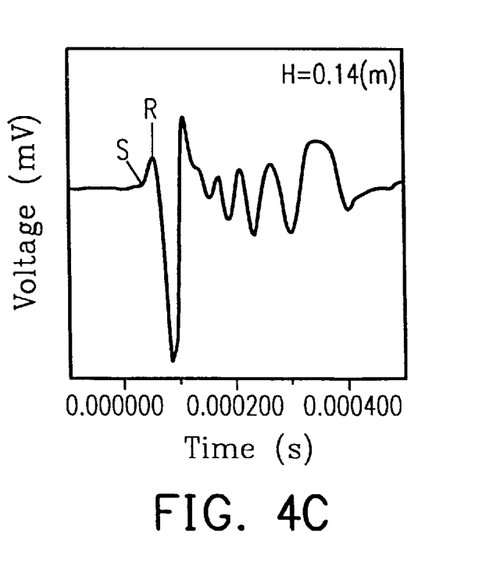
FIG. 4C shows a response waveform of the impact test according to FIG. 4A, wherein the distance between the impact point and the receiver is 0.14 m.

FIG. 4A is a schematic diagram of an impact test, in which a receiver 4 is disposed on a concrete structure 2 with a distance H from an impact 3. It is noted that the P-wave disturbs the particles of the concrete surface primarily in the horizontal direction while the S-wave and R-wave disturb the particles in the vertical direction. Therefore, if the vertical displacements of the particles of the concrete surface are measured, then the obtained initial responses are dominated by the S-wave and R-wave as shown in FIGS. 4B and 4C, regardless that the propagation of the P-wave is faster than the S-wave and R-wave on the concrete surface.

It is reminded that the R-wave propagates slightly slower than the S-wave. In addition, the energy of the R-wave is much more than that of the S-wave. Therefore, the initial disturbance of the particles of the concrete surface is mainly caused by the R-wave if the receiver is disposed close to the impact point as shown in FIG. 4B, in which the distance between the impact point 3 and the receiver 4 is 0.04 m. The disturbance of the particles of the concrete surface caused by the S-wave is not obvious. However, if the receiver is disposed a proper distance away from the impact point as shown in FIG. 4C, in which the distance between the impact point 3 and the receiver 4 is 0.14 m, then the disturbance caused by the S-wave will be obvious. It can be observed from FIG. 4C that the R-wave follows the S-Wave to cause another disturbance much stronger than the previous disturbance caused by the S-wave.

Reinforced concrete is now discussed. If an impact is applied on the surface of a reinforced concrete structure, then the generated P-wave and S-wave will propagate into the concrete structure and be refracted at the interface between the concrete and reinforcing bar. In the present invention, the P-wave is used to find the cover thickness of a reinforcing bar in concrete because the propagation of the P-wave is faster than that of the S-wave.

Figure 5:
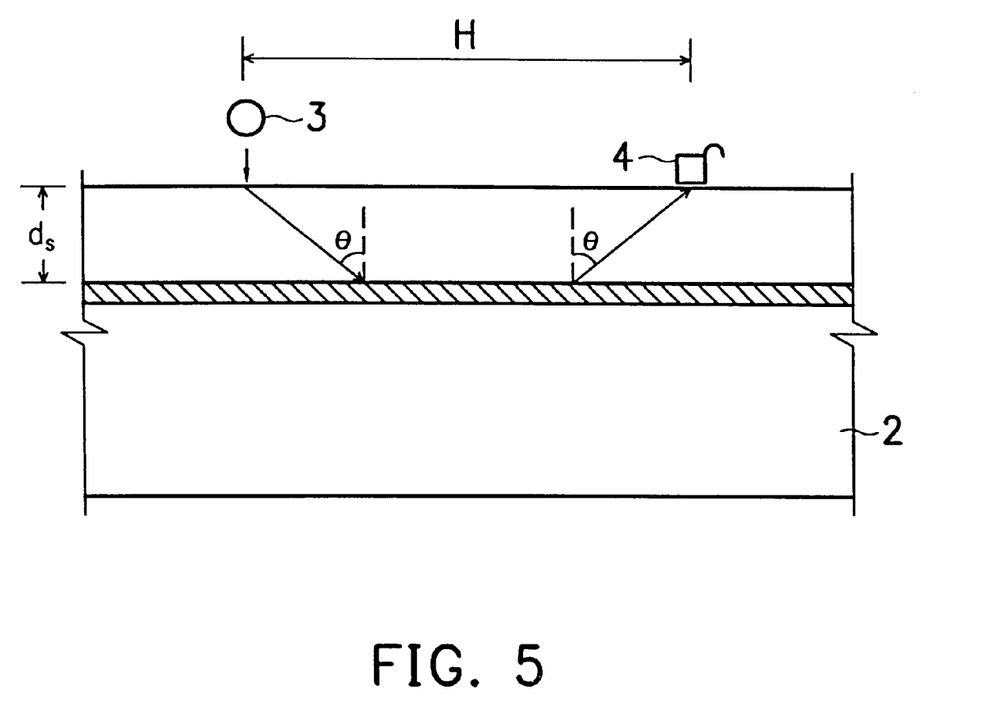
FIG. 5 shows the shortest path of a P-wave from an impact point through a reinforcing bar to a receiver.

FIG. 5 shows the shortest travel path of the P-wave from the impact point 3 through a reinforcing bar to the receiver 4, wherein θ is the critical angle of incidence for totally refracting the P-wave. The critical angle θ can be obtained by $\sin^{-1}(C_{PC}/C_{PS})$, where $C_{PC}$ and $C_{PS}$ respectively are the P-wave speeds in infinite concrete and steel. Then, the shortest time ($\Delta t_S$) for the P-wave propagating from the impact point through the reinforcing bar to the receiver is determined by:

$$\Delta t_S = \frac{2 \times d_S}{C_{PC} \times \cos\theta} + \frac{(H - 2 \times d_S \times \tan\theta)}{C'_{PS}} \quad (1)$$

where
- $d_S$ is the cover thickness of the reinforcing bar in concrete;
- H is the distance between the impact point and the receiver;
- $C_{PS}'$ is the P-wave speed in a thin steel rod.

The P-wave propagates faster than the S-wave and R-wave. Therefore, if the receiver is disposed a proper distance away from the impact point, then the P-wave propagating into the reinforced concrete through the steel reinforcing bar to the concrete surface can arrive at the receiver prior to the S-wave and R-wave propagating along the concrete surface, to cause the initial vertical disturbances of the particles of the concrete surface.

Figure 6A:
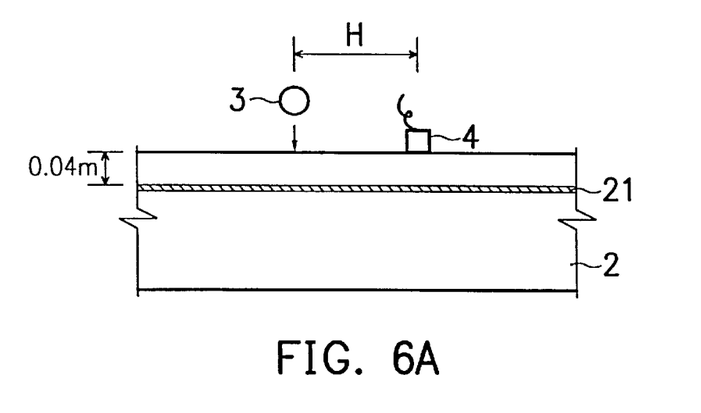
FIG. 6A shows an impact test for reinforced concrete structures.
Figure 6B:
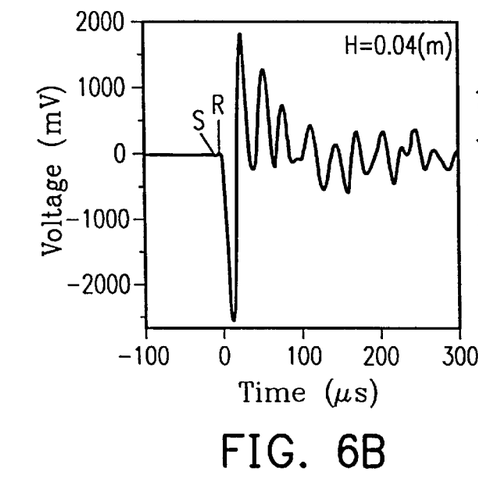
FIG. 6B shows a response waveform of the impact test according to FIG. 6A, wherein the distance between the impact point and the receiver is 0.04 m.
Figure 6C:
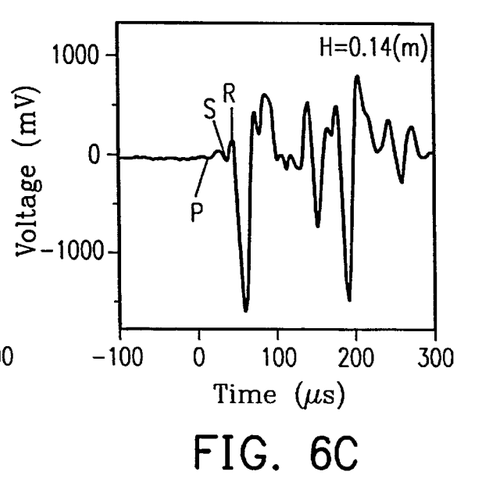
FIG. 6C shows a response waveform of the impact test according to FIG. 6A, wherein the distance between the impact point and the receiver is 0.14 m.

FIG. 6A shows an impact test for reinforced concrete. FIG. 6B shows response waveforms of the impact test by disposing the receiver 0.04 m away from the impact point, in which the initial displacement waveforms are dominated by the R-wave, like what is shown in FIG. 4B. However, if the receiver 4 is disposed a proper distance away from the impact point 3, then the P-wave refracted back to the concrete surface through the steel reinforcing bar can arrive at the receiver prior to the S-wave and R-wave propagating along the concrete surface, thereby causing the initial vertical disturbances of the particles of the concrete surface. As shown in FIG. 6C, in which the receiver is disposed 0.14 m away from the impact point, an upward disturbance caused by the P-wave can be easily identified and is obviously different from the disturbances caused by the S-wave and R-wave shown in FIG. 6B.

The arrival time ($t_S$) of the P-wave can be read from FIG. 6C. Then, the shortest travel time for the P-wave from the impact point through the reinforcing bar to the receiver is:

$$\Delta t_S = t_S - t_O \quad (2)$$

wherein $t_O$ is the time of impact initiation. Then, the cover thickness of the reinforcing bar in concrete can be obtained from formula (1):

$$d_S = \frac{C_{PC}\Delta t_S - \alpha H}{\frac{2}{\cos\theta} - 2\alpha\tan\theta} \text{ with } \alpha = C_{PC}/C'_{PS} \quad (3)$$

Figure 7:
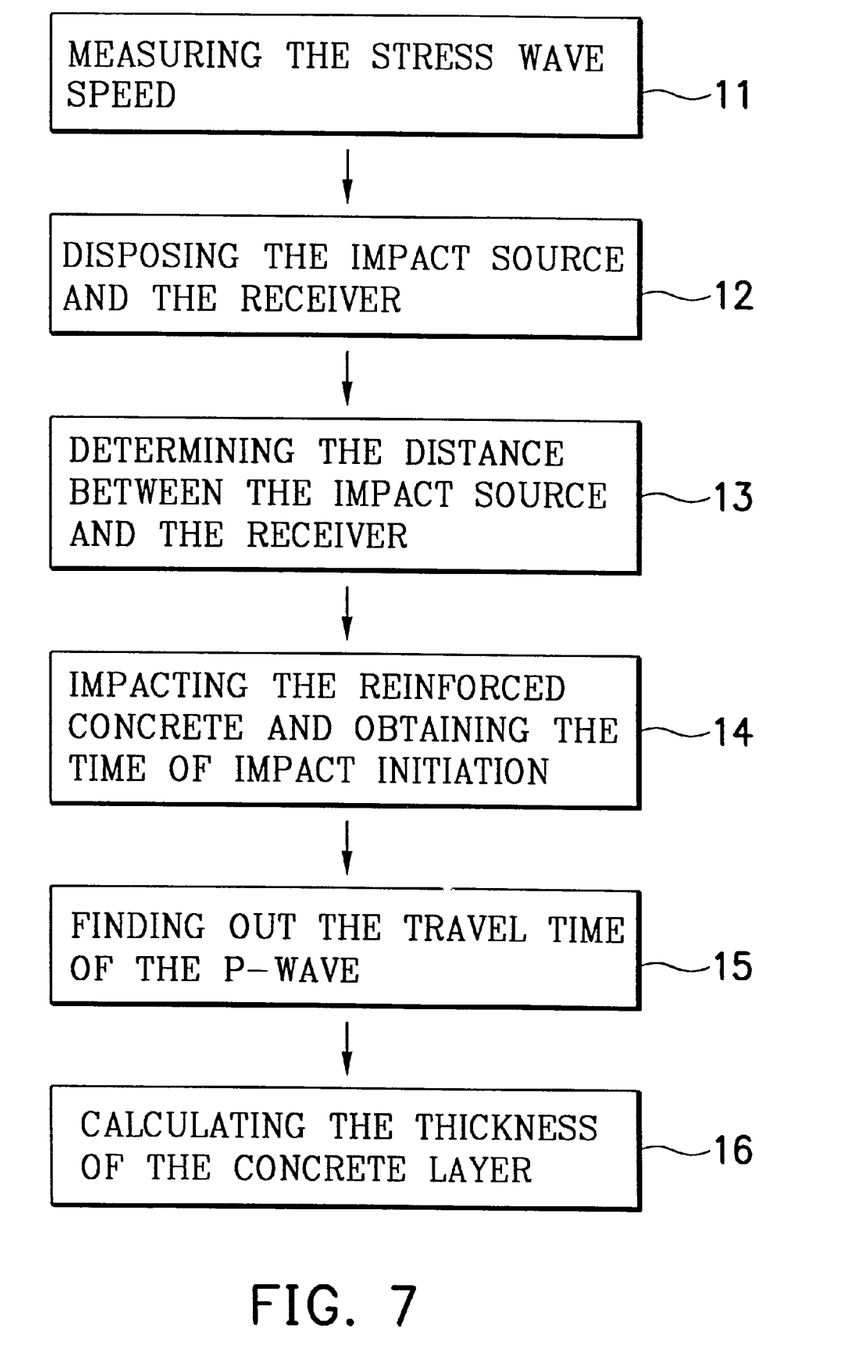
FIG. 7 is a flowchart of the present invention.

Referring to FIG. 7, the method for measuring the cover thickness of a reinforcing bar in concrete according to the present invention includes the following steps (I)–(VI):

(I) Measuring The Stress Wave Speed (Step 11)

The propagating speeds of the P-wave, S-wave and R-wave in a tested concrete structure are measured by using the prior art.

(II) Disposing The Impact Source And The Receiver (Step 12)

An impact source and a receiver are disposed on the tested concrete structure along the longitudinal axis of a reinforcing bar contained therein, by reference to the design drawing of the reinforced concrete structure.

(III) Determining The Distance Between The Impact Source And The Receiver (Step 13)

The receiver is disposed a proper distance away from the impact source in order to satisfy the following conditions (a) and (b):

(a) The P-wave refracted back to the concrete surface through the steel reinforcing bar can arrive at the receiver prior to the S-wave and R-wave propagating along the concrete surface.

(b) The disturbance caused by the P-wave and the disturbances caused by the S-wave and R-wave can be totally separated (as shown in FIG. 6C).

A reference minimum distance between the impact source and the receiver can be calculated by formula (4):

$$\text{Minimum } H = 2d_S\tan\theta + \left[t_C - \frac{(2C_{PC} - 2\sqrt{2}\,C_{SC})}{C_{SC}C_{PC}}(d_S)\right]\left(\frac{C_{SC}C'_{PS}}{C'_{PS} - C_{SC}}\right) \quad (4)$$

wherein $t_C$ is contact time for an impact;
$C_{PC}$ is the P-wave speed in infinite concrete;
$C_{SC}$ is the S-wave speed in infinite concrete;
$C_{PS}'$ is the P-wave speed in a thin steel rod.

In general, $$C_{PC} = 4000 \text{ m/s};$$
$$C_{SC} = 2440 \text{ m/s};$$
$$C_{PS} = 5860 \text{ m/s};$$
$$C'_{PS} = 5135 \text{ m/s};$$
$$\theta = \sin^{-1}(Cpc/Cps)$$
$$= \sin^{-1}(4000/5860)$$
$$= 43.05°$$

Thus, formula (4) can be rewritten as:

$$\text{Minimum } H = 1.9(d_S) + 4650(t_C - 0.000113 d_S) \quad (5)$$

The use of formula (5) is now discussed. The thickness of the concrete layer ($d_S$) is unknown. Therefore, $d_S$ is roughly pre-estimated. The estimated value generally is between 0.04 m–0.07 m. Furthermore, the contact time ($t_C$) for an impact is preferably less than 40 μs (40×10$^{-6}$) seconds. Assuming that $d_S$ and $t_C$ are respectively 0.04 m and 18 μs, the required minimum distance H between the impact source and receiver is 0.138 m by using formula (5).

Referring back to FIG. 6C, the distance (H) between the impact source and receiver is 0.14 m (>0.138 m). Therefore, the disturbance caused by the P-wave can be clearly identified.

(IV) Applying An Impact On The Reinforced Concrete And Obtaining The Time Of Impact Initiation (Step 14)

A direct method or an indirect method can be utilized to find the time of impact initiation ($t_O$). In the direct method, a force sensor is mounted in a small steel sphere (the impact source) to directly measure the impact contact time. Then, the time of impact initiation can be calculated according to the impact contact time. The structure of such a steel sphere is disclosed in Taiwanese Patent No. 87209842, which is now pending.

In the indirect method, an additional receiver is located close to the impact source for receiving the impact signal. Then, the time of the impact initiation can be calculated from the received signal.

(V) Determining The Travel Time Of The P-wave (Step 15)

The arrival time ($t_S$) of the P-wave from the impact point, through the reinforcing bar to the receiver can be read from the waveform recorded by the receiver. Then, the travel time $\Delta t_S$ of the P-wave can be obtained by the above-mentioned formula (2).

(VI) Calculating The Cover Thickness Of The Reinforcing Bar In Concrete (Step 16)

The cover thickness ($d_S$) of the reinforcing bar in concrete is calculated by using the above-mentioned formula (3).

In the present invention, measuring the cover thickness of the reinforcing bar in concrete is based on the shortest travel path of the P-wave. As a result, the measuring result only depends on the reinforcing bar under the impact point, without the influence of other reinforcing bars. Therefore, the present invention can be suitable for measuring the reinforced concrete structures in which the reinforcing bars are closely arranged.

EXAMPLE 1

Figure 8A:
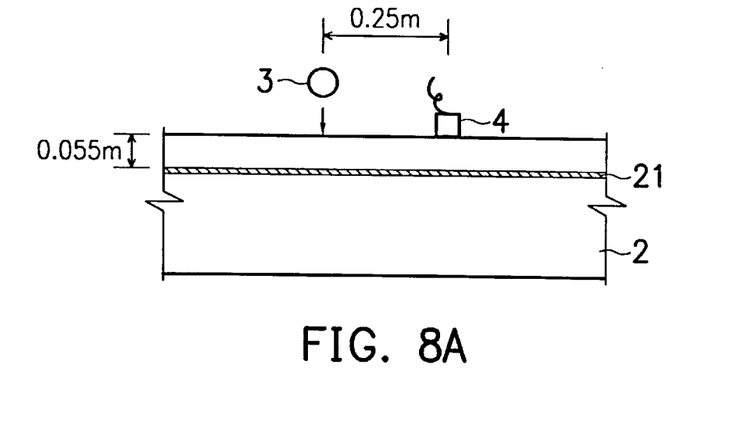
FIG. 8A shows an impact test according to a first example of the present invention.

The cover thickness of a reinforcing bar in concrete was known (0.055 m) before the test was made. As shown in FIG. 8A, a force sensor was mounted in a steel sphere (i.e. the impacting source) 3 for directly sensing the impact to obtain the time of impact initiation ($t_O$). The R-wave speed ($C_R$) along the surface of the tested concrete and the P-wave speed ($C_{PC}$) in the tested concrete were measured. Results showed $C_R$ was 1950 m/s and $C_{PC}$ was 4050 m/s. The contact time ($t_C$) of the impact on the concrete surface was about 35 μs. The cover thickness of the reinforcing bar was estimated at 0.055 m according to the known real value. By using formula (5), the minimum distance between the steel sphere 3 and the receiver 4 was 0.24 m. Thus, the receiver 4 was disposed 0.25 m away from the impact point 3.

Figure 8B:
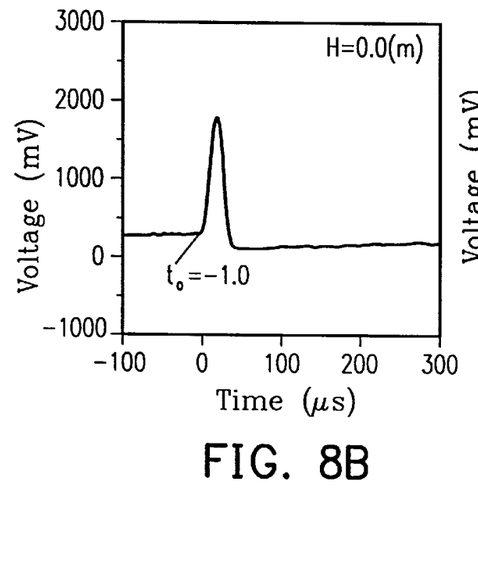
FIG. 8B shows the force-time history of the impact on the tested reinforced concrete according to the first example.
Figure 8C:
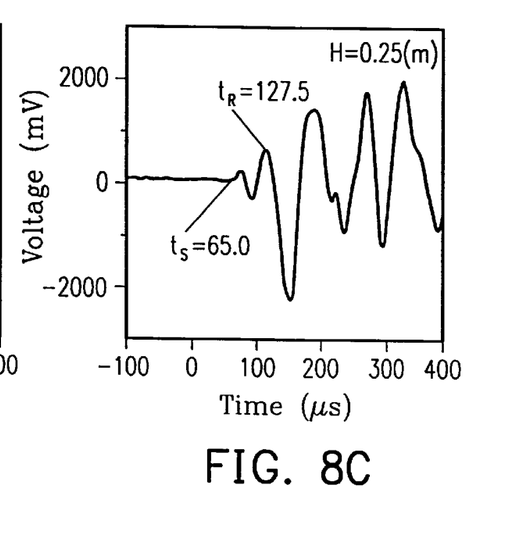
FIG. 8C shows the vertical displacement response on the concrete surface recorded by the receiver of the first example, wherein the distance between the impact point and the receiver is 0.25 m.

FIG. 8B shows the force-time history of the impact on the tested reinforced concrete, in which the time of the impact initiation ($t_O$) is –1.0 μs. FIG. 8C shows the vertical displacement response on the concrete surface recorded by the receiver 4, wherein the arrival time ($t_S$) for the P-wave from the impact point 3 through the reinforcing bar 21 to the receiver 4 is 65.0 μs. Thus, the travel time of the P-wave $\Delta t_S$ was 66.0 μs ($\Delta t_S = t_S - t_O = 65 - (-1) = 66$). Therefore, the cover thickness ($d_S$) of the reinforcing bar can be calculated by using formula (3). The calculated value was 0.0558 m, which was very close to the actual thickness (0.055 m).

Discussion about Example 1

In order to determine the distance between the impact source 3 and the receiver 4, the cover thickness of the reinforcing bar are pre-estimated. In this example, the cover thickness of the reinforcing bar was estimated at 0.055 m according to the known real value. In practice, however, the cover thickness of a reinforcing bar in concrete is unknown. Therefore, it is roughly estimated. The estimated value generally is between 0.04–0.07 m. Then, the distance between the impact source and receiver is temporarily determined by using formula (4). If the measured signal is bad (interfered with by the S-wave and R-wave along the concrete surface), then the receiver 4 is moved away from the impact point 3 until a good signal can be measured.

EXAMPLE 2

Figure 9A:
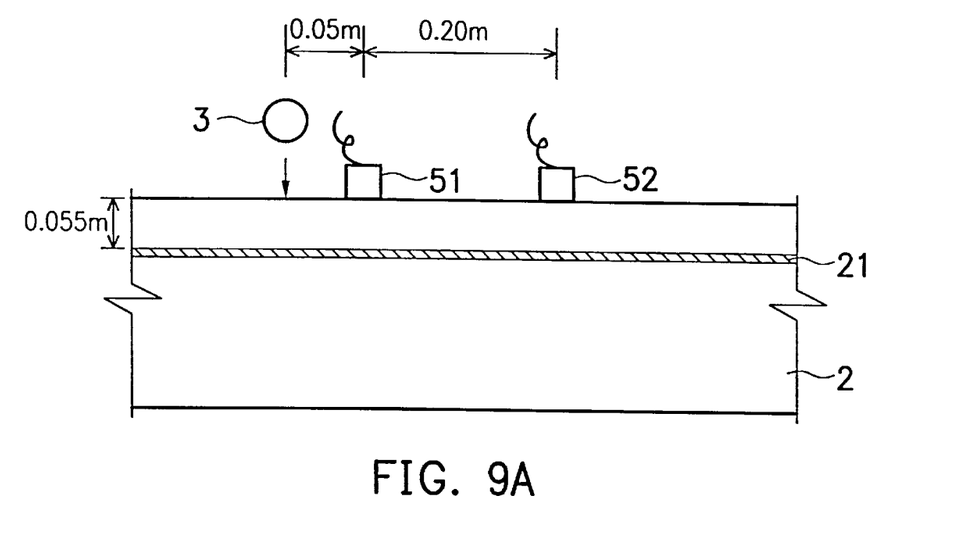
FIG. 9A shows an impact test according to a second example of the present invention.

The cover thickness of a reinforcing bar in concrete was known (0.055 m) before the test was made. Referring to FIG. 9A, a first receiver 51 and a second receiver 52 were disposed on the concrete surface. The first receiver 51 was 0.05 m away from the impact point 3, used for indirectly finding the time of impact initiation. The measured R-wave speed and the P-wave speed for the concrete were 1950 m/s and 4050 m/s, respectively. The contact time ($t_C$) for the impact was about 30 μs. The estimated thickness of the concrete layer was 0.055 m. By using formula (5), the minimum distance between the steel sphere 3 and the second receiver 52 was 0.22 m. Thus, the second receiver 52 was disposed 0.25 m away from the impact point 3.

Figure 9B:
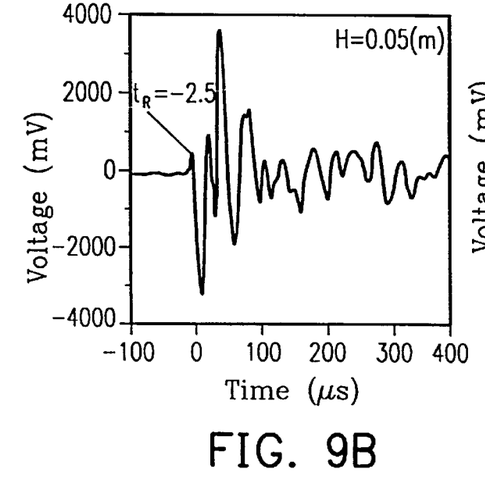
FIG. 9B shows the vertical displacement response on the concrete surface recorded by a first receiver according to the second example, wherein the distance between the impact point and the first receiver is 0.05 m.

FIG. 9B shows the vertical displacement response recorded by the first receiver 51, wherein the travel time for the R-wave propagating along the concrete surface to the first receiver 51 is −2.5 μs. The time of impact initiation $t_O$ was calculated by:

$$t_O = -2.5 \times 10^{-6} - (0.05/1950)$$

$$= -28.1 \times 10^{-6}$$

$$= -28.1 \mu s$$

Figure 9C:
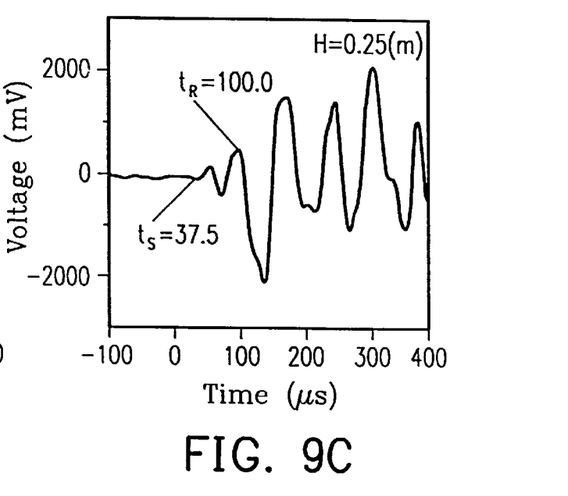
FIG. 9C shows the vertical displacement response on the concrete surface recorded by a second receiver according to the second example, wherein the distance between the impact point and the second receiver is 0.25 m.

FIG. 9C shows the vertical displacement response recorded by the second receiver, wherein the arrival time ($t_S$) for the P-wave from the impact point 3 through the reinforcing bar 21 to the second receiver 52 is 37.5 μs. The travel time of the P-wave $\Delta t_S$ was 65.6 μs ($\Delta t_S = t_S - t_O = 37.5 - (-28.1) = 65.6$). Then, the thickness ($d_S$) of the concrete layer can be calculated by using formula (3). The calculated value was 0.0545 m, which was close to the actual thickness (0.055 m).

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for measuring a thickness of a cover layer of a reinforcing bar, comprising the steps of:

(a) disposing an impacting device and a first receiver on a surface of the cover layer along a longitudinal axis of the reinforcing bar, with a predetermined distance H provided between the impacting device and the first receiver;

(b) applying an impact on the surface of the cover layer with the impacting device to generate a dilatational wave which propagates into the cover layer and is totally refracted at an interface between the cover layer and the reinforcing bar, and is received by the first receiver;

(c) determining the travel time $\Delta t_S$ of the dilatational wave from the impacting device through the reinforcing bar to the first receiver;

(d) calculating the thickness of the cover layer of the reinforcing bar by:

$$d_S = \frac{C_{PC} \Delta t_S - \alpha H}{\dfrac{2}{\cos\theta} - 2\alpha\tan\theta} \text{ with } \alpha = C_{PC}/C'_{PS}$$

wherein $d_S$ is the thickness of the cover layer of the reinforcing bar;

$\Delta t_S$ is the travel time of the dilatational wave from the impacting device through the reinforcing bar to the first receiver;

$C_{PC}$ is a first speed of the dilatational wave in the cover layer;

$C_{PS}'$ is a second speed of the dilatational wave in the reinforcing bar;

H is the distance between the impacting device and the first receiver;

θ is a critical angle of incidence for totally refracting the dilatational wave.

2. A method for measuring a thickness of a cover layer of a reinforcing bar as claimed in claim 1, wherein the impacting device in step (a) is a steel sphere.

3. A method for measuring a thickness of a cover layer of a reinforcing bar as claimed in claim 2, wherein a diameter of the steel sphere is 2–5 mm.

4. A method for measuring the thickness of a cover layer of a reinforcing bar as claimed in claim 1, wherein time $t_O$ of initiation of the impact is measured by the impacting device; arrival time $t_S$ of the dilatational wave at the first receiver is measured by the first receiver; and the travel time $\Delta t_S$ of the dilatational wave is calculated by $t_S - t_O$.

5. A method for measuring the thickness of a cover layer of a reinforcing bar as claimed in claim 1, wherein in step (a) a second receiver is further disposed between the impacting device and the first receiver;

in step (b) the impact further generates a Rayleigh wave propagating along the surface of the cover layer; arrival time $t_S$ of the dilatational wave at the first receiver is measured by the first receiver; arrival time $t_S'$ of the Rayleigh wave at the second receiver is measured by the second receiver;

in step (c) the travel time $\Delta t_S$ is obtained by $t_S - (t_S' - D/V)$ where D is a distance between the impacting device and the second receiver; V is a speed of the Rayleigh wave on the surface of the cover layer.

6. A method for measuring a thickness of a cover layer of a reinforcing bar as claimed in claim 1, including mounting a force sensor within the impacting device to determine time of impact.

7. A method for measuring a thickness of a cover layer of a reinforcing bar as claimed in claim 1, including locating a receiver proximate to a point of contact of the impacting device to determine time of impact.

* * * * *